(12) United States Patent
Chan et al.

(10) Patent No.: US 10,186,876 B2
(45) Date of Patent: Jan. 22, 2019

(54) BATTERY MODULE CHARGING AND DISCHARGING CONTROL METHOD AND A BATTERY SYSTEM

(71) Applicants: Ka Yin Victor Chan, Macau (MO); Sok Lei Leong, Macau (MO)

(72) Inventors: Ka Yin Victor Chan, Macau (MO); Sok Lei Leong, Macau (MO)

(*) Notice: Subject to any disclaimer, the term of this patent is extended or adjusted under 35 U.S.C. 154(b) by 69 days.

(21) Appl. No.: 15/306,107

(22) PCT Filed: Mar. 23, 2016

(86) PCT No.: PCT/CN2016/077076
§ 371 (c)(1),
(2) Date: Oct. 24, 2016

(87) PCT Pub. No.: WO2017/054423
PCT Pub. Date: Apr. 6, 2017

(65) Prior Publication Data
US 2017/0271885 A1    Sep. 21, 2017

(30) Foreign Application Priority Data
Sep. 30, 2015  (CN) .......................... 2015 1 0646435

(51) Int. Cl.
*H02J 7/00*   (2006.01)
*H01M 10/42*  (2006.01)
(Continued)

(52) U.S. Cl.
CPC ....... *H02J 7/0003* (2013.01); *H01M 10/4207* (2013.01); *H01M 10/44* (2013.01);
(Continued)

(58) Field of Classification Search
None
See application file for complete search history.

(56) References Cited

U.S. PATENT DOCUMENTS

2002/0154518 A1* 10/2002 Elferich ................. H02J 7/025
                                                              363/15
2009/0251100 A1   10/2009 Incledon
(Continued)

FOREIGN PATENT DOCUMENTS

EP    2355229 A1    8/2011

OTHER PUBLICATIONS

Supplementary European Search and European Search Opinion of EP application No. 16794912.2 issued from the European Patent Office dated Jul. 17, 2017.

*Primary Examiner* — David V Henze-Gongola
(74) *Attorney, Agent, or Firm* — Spruson & Ferguson (Hong Kong) Limited

(57) ABSTRACT

A battery module charging and discharging control method comprising: determining the charging priority of battery modules in a battery system; raising the charging priority of the battery modules that are more difficult to unload, load, and/or replace; lowering the charging priority of the battery modules that are easier to unload, load, and/or replace; causing the battery modules with higher charging priority to take precedence over the battery modules with lower charging priority during the charging control of the battery modules; determining the discharging priority of the battery modules; raising the discharging priority of the battery modules that are easier to unload, load, and/or replace; and lowering the discharging priority of the battery modules that are more difficult to unload, load, and/or replace; causing the battery modules with higher discharging priority to take precedence over the battery modules with lower discharging priority during the discharging control of the battery modules.

8 Claims, 2 Drawing Sheets

(51) Int. Cl.
*H01M 10/44* (2006.01)
*H01M 10/48* (2006.01)

(52) U.S. Cl.
CPC ......... *H01M 10/482* (2013.01); *H02J 7/0013* (2013.01); *H02J 7/0014* (2013.01); *H01M 2010/4271* (2013.01)

(56) References Cited

U.S. PATENT DOCUMENTS

| | | | |
|---|---|---|---|
| 2010/0244721 A1* | 9/2010 | Shloush | H05B 41/28 315/247 |
| 2015/0130421 A1 | 5/2015 | Bevilacqua, III | |
| 2016/0226268 A1* | 8/2016 | Okui | H02J 7/0018 |
| 2017/0070085 A1* | 3/2017 | Cher | H02S 40/38 |

* cited by examiner

BATTERY MODULE CHARGING AND DISCHARGING CONTROL METHOD AND A BATTERY SYSTEM

BACKGROUND

Batteries are a widely used means for storing electric energy. At present, many instruments, electronic equipment, industrial equipment, automobiles, and more use batteries for their power supplies. However, electric energy stored in a single battery cell is often limited, and thus a battery system containing a plurality of battery modules is typically used to power an automobile or a device of larger power consumption. A battery module can be a single battery cell or a component that is severable from the battery system and can be individually unloaded, loaded, and replaced.

For example, shown in FIG. 1 is a battery system containing a plurality of battery modules. The battery modules in this battery system are arranged in m rows and n columns, so the number of the battery modules is m×n. Due to the size limitation of the battery modules, the electric energy stored in each battery module is limited; hence the battery modules in use would be quickly depleted and need frequent recharging or replacement. Charging and replacing battery modules bring about the following challenges.

First, the battery modules in a battery system are usually housed in a secured container. During the charging of the battery modules, a specialized electrical cable is often needed to connect the battery modules to some battery-charging equipment. In a battery system for automobiles, the connectors of the battery modules and the charging equipment are often specially engineered or custom-made. In certain complex cases, probably only trained personnel can use the electrical cables properly to make the proper connection between the battery modules and the charging equipment. Also, this cable connection task is often laborious and time consuming, making battery module charging exceedingly inconvenient.

Second, the battery system container is to house the plurality of battery modules and yet is often provided with only one small opening for battery module loading and unloading. For example, as shown in FIG. 1, the opening for loading and unloading of battery modules is located on the top of the battery system container, making the unloading and loading of the battery modules located at the bottom of the container quite difficult, especially for the last row of battery modules (e.g. [m, 1], [m, 2], . . . ).

Lastly, in some battery systems, battery modules can only be recharged after being unloaded from their battery systems. As the battery modules are usually heavy, the unloading and loading of battery modules may require much manual labor, in turn resulting in low efficiency in the unloading and reloading of the battery modules. In particular, for example, the battery modules located at the bottom of the container in FIG. 1 are difficult to unload and reload, leading to low efficiency in and excessive manual labor for the recharging of the battery system.

If one chooses to replace the battery modules in a battery system, one needs to unload all the battery modules to be replaced in the battery system one by one, and then reload the replacement battery modules at the corresponding positions one by one. This obviously also requires much manual labor, especially in cases where the battery modules to replace are located at the bottom of a container such as that shown in FIG. 1.

SUMMARY OF THE INVENTION

One objective of the present invention is to provide a battery module charging and discharging control method that reduces manual labor required for the recharging of the battery system and the replacement of the battery modules. It is also an objective of the present invention to provide a battery system that is more efficient and less labor-intensive in the recharging or replacement of its battery modules.

In accordance with one embodiment of the present invention, a battery module charging and discharging control method is provided, the method comprising: determining the charging priority of a plurality of battery modules in a battery system; raising the charging priority of the battery modules in the battery system that are more difficult to unload, load, and/or replace; lowering the charging priority of the battery modules in the battery system that are easier to unload, load, and/or replace; causing the battery modules with higher charging priority to take precedence over the battery modules with lower charging priority in the controlled charging of the battery modules; determining the discharging priority of the plurality of battery modules in the battery system; raising the discharging priority of the battery modules in the battery system that are easier to unload, load, and/or replace; lowering the discharging priority of the battery modules in the battery system that are more difficult to unload, load, and/or replace; and/or causing the battery modules with higher discharging priority to take precedence over the battery modules with lower discharging priority in the controlled discharging of the battery modules.

As described above, the charging and/or discharging priorities of the plurality of battery modules are determined according to the levels of difficulty of the battery modules' unloading, loading, and/or replacement. The battery modules that are more difficult to unload, load, and/or replace take precedence during charging, and/or the battery modules that are easier to unload, load, and/or replace take precedence during discharging. This increases the states of charge of the battery modules that are more difficult to unload, load, and/or replace, and decreases the states of charge of the battery modules that are easier to unload, load, and/or replace, avoiding frequent unloading and/or loading of the battery modules that are more difficult to unload and/or load during their charging, and/or frequent replacement of the battery modules that are more difficult to unload and/or load, and in turn reducing the manual labor required for the charging and/or replacement of the battery modules.

Preferably, the causing of the battery modules with higher charging priority to take precedence over those with lower charging priority during charging includes: controlling the charging currents such that the relative charging current intensities of the battery modules with higher charging priority are greater than those of the battery modules with lower charging priority. The relative charging current intensity is the ratio of the charging current intensity provided to a battery module to the energy storage capacity of the battery module.

Therefore, the charging current intensity of each battery module can be determined according to the charging priority and energy storage capacity of the battery module. The charging of each battery module can then be adjusted to ensure that the battery modules with higher charging priority will retain more electric energy, so as to increase the states of charge of the battery modules that are more difficult to unload, load, and/or replace, reducing the need for recharging these battery modules and avoiding their frequent unloading, loading, and/or replacement.

Preferably, the causing of the battery modules with higher charging priority to take precedence over the battery modules with lower charging priority during charging includes:

while charging the battery modules with higher charging priority, stop or refrain from charging the battery modules with lower charging priority.

Thereby, stopping or refraining from charging the battery modules with lower charging priority at the appropriate times ensures that the battery modules with higher charging priority receive sufficiently high charging current intensities, so that the battery modules with higher charging priority take precedence in being charged.

In accordance with another embodiment of the present invention, the battery module charging and discharging control method is provided in which the battery modules with higher discharging priority discharge, and thereby charge the battery modules with higher charging priority. Thus, the battery modules with higher discharging priority charge the battery modules with higher charging priority, realizing the objectives of the battery modules that are more difficult to unload, load, and/or replace taking precedence in charging and the battery modules that are easier to unload, load, and/or replace taking precedence in discharging. This in turn realizes the objective of avoiding frequent unloading, loading, and/or replacement of the battery modules that are more difficult to unload, load, and/or replace.

Preferably, the causing of the battery modules with higher discharging priority taking precedence over the battery modules with lower discharging priority during discharging includes: controlling the discharging current such that the relative discharging current intensities of the battery modules with higher discharging priority is greater than those of the battery modules with lower discharging priority. The relative discharging current intensity is the ratio of the discharging current intensity drawn from a battery module to the energy storage capacity of the battery module.

Therefore, determining the discharging current intensity of each battery module according to the discharging priority and the energy storage capacity of the battery module ensures that the relative discharging current intensities of the battery modules with higher discharging priority is higher, and the relative discharging current intensities of the battery modules with lower discharging priority is lower. This in turn increases the states of charge of the battery modules that are more difficult to unload, load, and/or replace, reduces the charging need of these battery modules, and avoids frequent unloading, loading, and/or replacement of these battery modules.

Preferably, the causing of the battery modules with higher discharging priority to take precedence over the battery modules with lower discharging priority during discharging includes: while discharging the battery modules with higher discharging priority, stop or refrain from discharging the battery modules with lower discharging priority.

Thereby, stopping or refraining from discharging the battery modules with lower discharging priority at the appropriate times can avoid early discharging of the battery modules with lower discharging priority, thus preventing frequent replacement of the battery modules that are more difficult to unload, load, and/or replace.

In order to realize the other objective mentioned above, the battery system provided by the present invention includes a plurality of battery modules and a controller. The controller is to determine the charging priority of a plurality of battery modules, that is to raise the charging priority of the battery modules in the battery system that are more difficult to unload, load, and/or replace; and lower the charging priority of the battery modules in the battery system that are easier to unload, load, and/or replace. The controller is also to cause the battery modules with higher charging priority to take precedence over the battery modules with lower charging priority while controlling the charging of a plurality of battery modules. The controller is also to determine the discharging priority of a plurality of battery modules in the battery system, that is to raise the discharging priority of the battery modules in the battery system that are easier to unload, load, and/or replace; and lower the discharging priority of the battery modules in the battery system that are more difficult to unload, load, and/or replace. The controller is also to cause the battery modules with higher discharging priority to take precedence over the battery modules with lower discharging priority when controlling the discharging of a plurality of battery modules.

As can be seen from the above-described embodiments, by means of the controller controlling the charging priority and/or discharging priority of a plurality of battery modules in the battery system during charging and/or discharging, the battery modules that are more difficult to unload, load, and/or replace take precedence during charging and/or do not take precedence during discharging, and the battery modules which are easier to unload, load, and/or replace take precedence during discharging and/or do not take precedence during charging. This way, the states of charge of the battery modules that are more difficult to unload, load, and/or replace can be raised, and the charging need of the battery modules that are more difficult to unload, load, and/or replace can be reduced, so as to avoid frequent unloading, loading, and/or replacement of the battery modules that are difficult to unload, load, and/or replace, and reduce the labor required for the charging and replacement of the battery system. Furthermore, the charging efficiency of the battery system can then become higher as one usually only needs to unload, load, and/or replace the battery modules that are easier to unload, load, and/or replace.

BRIEF DESCRIPTION OF THE DRAWINGS

Embodiments of the invention are described in more detail hereinafter with reference to the drawings, in which.

DETAILED DESCRIPTION OF THE INVENTION

In the following description, battery systems and methods of charging and discharging battery and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figures 1, 2:
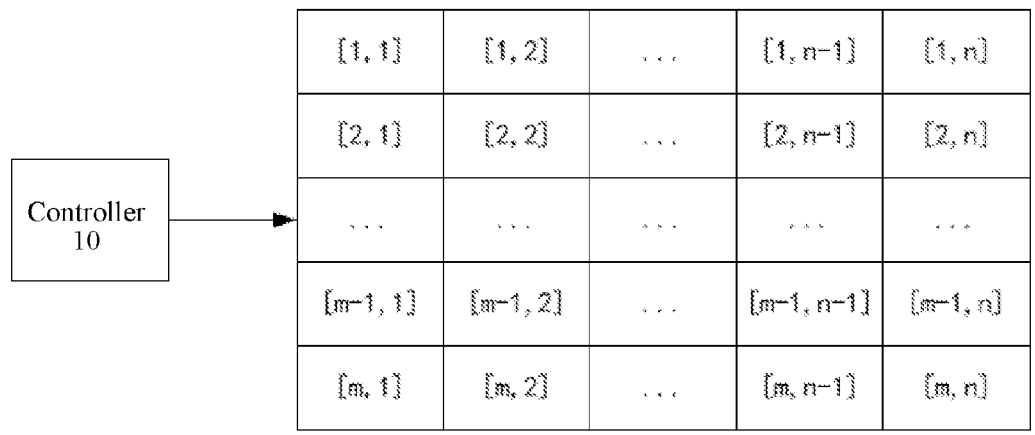
FIG. 1 is a block diagram of the conventional battery system.
FIG. 2 is a block diagram of a battery system in accordance with an embodiment of the present invention.

In accordance with an embodiment of the present invention, the battery system comprises a plurality of battery modules that can be independently unloaded and loaded. As shown in FIG. 2, the plurality of battery modules are arranged in m rows by n columns, and housed in a container. For example, when a battery system is used in an electric vehicle, battery modules are housed in a specific container of the electric vehicle. Of course, the battery system can also be applied to other fields, such as those of electronic equipment, instruments, meters, and machineries.

The battery system of the present invention is also provided with a controller 10, which controls the charging and/or discharging of the plurality of battery modules. In particular, the controller 10 determines the charging and/or discharging priority of each battery module according to the unloading, loading, and/or replacement difficulty of each battery module, and determines the charging and/or discharging of each battery module according to the charging priority and/or discharging priority of each battery module.

In this embodiment, the battery modules are arranged in m rows by n columns, of which the first row of battery modules, i.e., [1, 1], [1, 2], . . . , [1, n], are located in the uppermost positions of the container, the second row of battery modules, i.e., [2, 1], [2, 2], . . . , [2, n], are located in the second uppermost positions of the container, and the last row of battery modules, i.e., [m, 1], [m, 2], . . . , [m, n], are located in the lowest positions of the container, and so on.

Furthermore, as the top of the container is the opening for battery modules' unloading, loading, and/or replacement, the unloading, loading, and/or replacement of the battery modules located at the top, i.e., [1, 1], [1, 2], . . . , [1, n], is easiest. The unloading, loading, and/or replacement of the second row of battery modules, i.e., [2, 1], [2, 2], . . . , [2, n], is slightly more difficult than that of the first row of battery modules; the unloading, loading, and/or replacement of the last row of battery modules, i.e., [m, 1], [m, 2], . . . , [m, n], is most difficult; and the unloading, loading, and/or replacement difficulty of the second last row of battery modules, i.e., [m−1, 1], [m−1, 2], . . . , [m−1, n], is only next to that of the last row of battery modules.

Each row may be provided with only one battery module in the battery system. In the case where the opening for unloading and/or loading is located at the top of the container, the unloading, loading, and/or replacement of the battery module located at the top is the easiest, whereas the unloading, loading, and/or replacement of the battery module located at the bottom is most difficult, and the difficulty of the unloading, loading, and/or replacement of the battery modules varies with their positions in the container. In this case, the charging and/or discharging priority may still be determined for each battery module according to said principle.

The main philosophy of the present invention is to minimize the frequencies of unloading, loading, and/or replacement of the battery modules that are more difficult to unload, load, and/or replace, and allow more frequent unloading, loading, and/or replacement of the battery modules that are easier to unload, load, and/or replace. This reduces the labor required for battery module unloading, loading, and/or replacement and improves the battery module charging and/or replacement efficiency. Thus, the plurality of battery modules must first be ranked. In other words, the charging and/or discharging priority of each battery module must be determined according to the unloading, loading, and/or replacement difficulty of each battery module.

Figure 3:
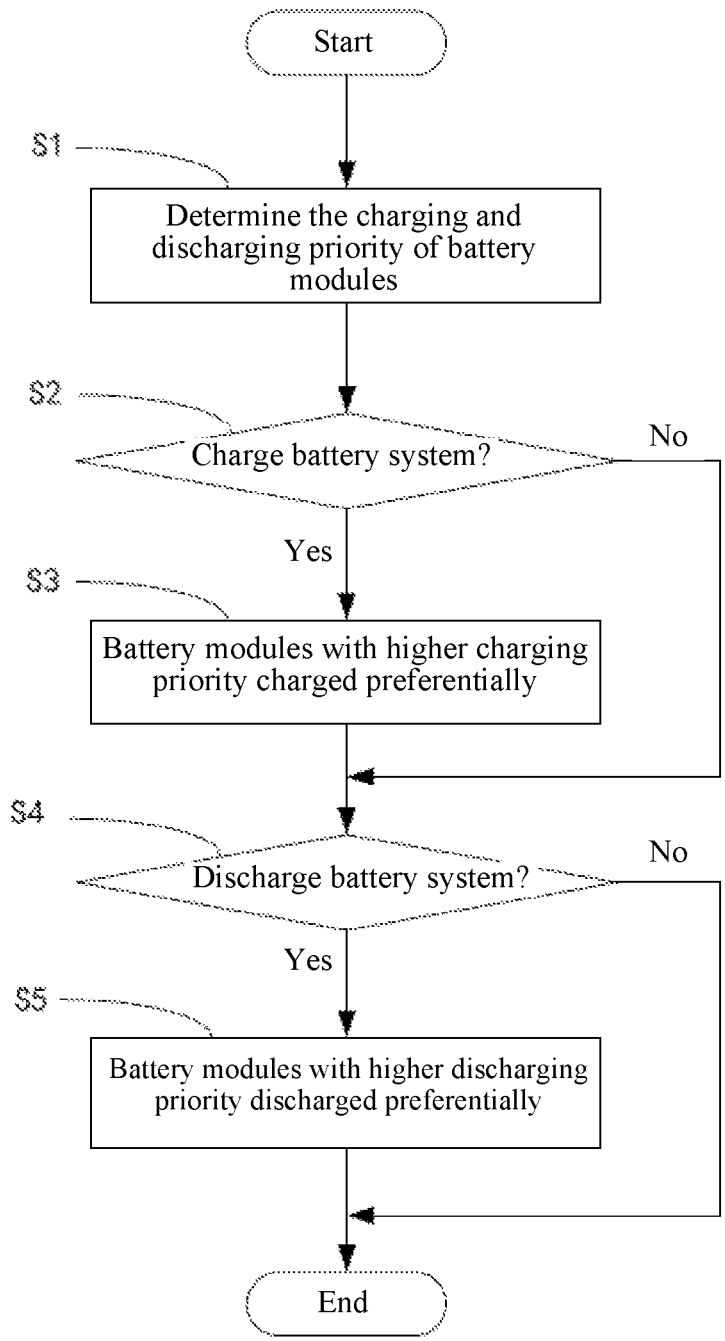
FIG. 3 is a flowchart of a battery module charging and discharging control method in accordance with an embodiment of the present invention.

FIG. 3 is a flowchart of the method in which a controller 10 controls the charging and discharging of a plurality of battery modules, wherein step S1 is to determine the charging priority and discharging priority of a plurality of battery modules. In this embodiment, the controller 10 determines each battery module's charging priority according to its position, i.e., according to its unloading, loading, and/or replacement difficulty. For example, the charging priority of the battery modules that are more difficult to unload, load, and/or replace is higher, whereas the charging priority of the battery modules that are easier to unload, load, and/or replace is lower. Therefore, in the battery system as shown in FIG. 2, the charging priority of the last row of battery modules, i.e., [m, 1], [m, 2], . . . , [m, n], is the highest, the charging priority of the second last row of battery modules, i.e., [m−1, 1], [m−1, 2], . . . , [m−1, n], is next only to that of the last row of battery modules, the charging priority of the first row of battery modules, i.e., [1, 1], [1, 2], . . . , [1, n], is the lowest, and so on.

Of course, the charging priority of the battery modules is not necessarily determined only according to their unloading, loading, and/or replacement difficulty. The goal of the present invention, nonetheless, is realized by raising the charging priority of the battery modules that are more difficult to unload, load, and/or replace, and/or lowering the charging priority of the battery modules that are easier to unload, load, and/or replace.

Furthermore, the controller 10 also determines the discharging priority of each battery module according to its position. Contrary to the charging priority's determination method, among a plurality of battery modules, the discharging priority of the battery modules that are more difficult to unload, load, and/or replace is lower, whereas the discharging priority of the battery modules that are easier to unload, load, and/or replace is higher. For example, in the battery system as shown in FIG. 2, the discharging priority of the first row of battery modules, i.e., [1, 1], [1, 2], . . . , [1, n], is the highest, the discharging priority of the second row of battery modules, i.e., [2, 1], [2, 2], . . . , [2, n], is next only to that of the first row of battery modules, the discharging priority of the last row of battery modules, i.e., [m, 1], [m, 2], . . . , [m, n], is the lowest, and so on.

Of course, the discharging priority of the battery modules is not necessarily determined only according to their unloading, loading, and/or replacement difficulty. The goal of the present invention, nonetheless, is realized by raising the discharging priority of the battery modules that are easier to unload, load, and/or replace, and/or lowering the discharging priority of the battery modules that are more difficult to unload, load, and/or replace.

After the determination of the charging and discharging priority of each battery module, if the controller 10 determines in step S2 that the battery system needs charging, the controller 10 will control the charging of each battery module according to its charging priority in step S3 such that the battery modules with higher charging priority will take precedence over the battery modules with lower charging priority during charging.

In accordance with one embodiment of the present invention, the causing of the battery modules with higher charging priority to take precedence over the battery modules with lower charging priority during charging can be realized as follows: control the charging current such that the relative charging current intensities of the battery modules with higher charging priority are greater than those of the battery modules with lower charging priority. As the energy storage capacities of different battery modules may not be the same, if the same charging current intensity is provided, the states of charge of the battery modules with smaller energy storage capacities will increase at higher rates, whereas the states of charge of the battery modules with larger energy storage capacities will increase at lower rates. Thus, if higher charging current intensities are simply provided to the battery modules with higher charging priority without considering their energy storage capacities, it is possible that the states of charge of the battery modules with higher charging priority may still increase at lower rates in case of their energy storage capacities being larger. Therefore, it is necessary that higher relative charging current intensities be provided to the battery modules with higher charging priority.

Therefore, in accordance with one embodiment of the present invention, higher relative charging current intensities are provided to the battery modules with higher charging priority and lower relative charging current intensities are provided to the battery modules with lower charging priority. The relative charging current intensity of the present invention is the ratio of the charging current intensity provided to a battery module to the energy storage capacity of the battery module. The higher charging priority the battery modules have, the higher relative charging current intensities they can obtain.

In accordance with the aforesaid embodiment, the battery modules that are most difficult to unload, load, and/or replace (e.g., the last row of battery modules in the battery system as shown in FIG. 2) receive the highest relative charging current intensities. The first row of battery modules receive the lowest relative charging current intensities, and the relative charging current intensities received by the second row of battery modules are slightly higher than those received by the first row of battery modules, and so on.

In accordance with another embodiment, while charging the battery modules with higher charging priority, the control method causes to stop or refrain from charging the battery modules with lower charging priority. Thus, after conducting step S2, if the controller 10 determines that the battery system needs charging, the controller 10 conducts step S3, which provides higher relative charging current intensities to the battery modules with higher charging priority, and either provides lower relative charging current intensities to the battery modules with lower charging priority or stops or refrains from charging the battery modules with lower charging priority.

Similarly, when the controller 10 controls the discharging of a plurality of battery modules, it also determines the discharging current intensity of each battery module according to the battery module's energy storage capacity and discharging priority such that the relative discharging current intensities of the battery modules with higher discharging priority are greater than those of the battery modules with lower discharging priority. The relative discharging current intensity is the ratio of the discharging current intensity drawn from a battery module to the energy storage capacity of the battery module. Therefore, the battery modules that are most difficult to unload, load, and/or replace (e.g., the last row of battery modules in the battery system as shown in FIG. 2) have the lowest relative discharging current intensities, whereas the battery modules which are easiest to unload, load, and/or replace (e.g., the first row of battery modules in the battery system as shown in FIG. 2) have the highest relative discharging current intensities, and the relative discharging current intensities of the second row of battery modules are slightly lower than those of the first row of battery modules, and so on.

In accordance with yet another embodiment, while discharging the battery modules with higher discharging priority, the control method causes to stop or refrain from discharging the battery modules with lower discharging priority. Thus, after conducting step S4, if the controller 10 determines that the battery system needs discharging, the controller 10 conducts step S5, which causes the battery modules with higher discharging priority to output higher relative discharging current intensities, and either causes the battery modules with lower discharging priority to output lower relative discharging current intensities or stops or refrains from discharging the battery modules with lower discharging priority.

In addition, the control method can also cause the battery modules with higher discharging priority to discharge so as to charge the battery modules with higher charging priority. As the battery modules with higher discharging priority are usually those that are easier to unload, load, and/or replace, such as the first and second rows of battery modules in the battery system as shown in FIG. 2, whereas the battery modules with higher charging priority are usually those that are more difficult to unload, load, and/or replace, such as the last row of battery modules in FIG. 2, causing the battery modules with higher discharging priority to discharge so as to charge the battery modules with higher charging priority is functionally equivalent to the battery modules with higher discharging priority in the battery system discharging so as to charge the battery modules with higher charging priority in the battery system, for the realization of charging of such battery modules with higher charging priority.

In accordance with various embodiments, charging priority is given to the battery modules in the battery system that are more difficult to unload, load, and/or replace, but in the discharging process, discharging priority is not given to such battery modules, so that the states of charge of the battery modules that are more difficult to unload, load, and/or replace are increased, and the probability of their unloading for the purpose of charging and/or replacement is significantly decreased. On the other hand, discharging priority is given to the battery modules that are easier to unload, load, and/or replace, but in the charging process, charging priority is not given to such battery modules, so that the states of charge of the battery modules that are easier to unload, load, and/or replace are decreased, and the probability of their unloading for the purpose of charging and/or replacement is increased. The unloading, loading, and/or replacement of the battery modules that are easier to unload, load, and/or replace are less difficult and require less labor and time. Ultimately, the control methods in accordance with the embodiments of the present invention reduce the overall effort required for the unloading, loading, and/or replacement of battery modules during the use of the battery system, and improve the charging efficiency of battery systems of which the battery modules cannot be charged without their unloading.

For electrical equipment that has high power consumption and battery systems of large sizes, such as electric vehicles, large portable electrical equipment, etc., the methods of the present invention can improve the usage efficiency of the battery systems and bring great convenience to the users.

The above-described embodiments are set forth as preferred exemplary embodiments of the present invention. It is possible to arrive at variations in other practical applications without departing from the scope of the present invention. For example, in the battery system as shown in FIG. 2, if the opening for battery module loading and/or unloading is located on the left side of the container rather than at the top, then the first column of battery modules, i.e., [1, 1], [2, 1], [m, 1], are easiest to unload, load, and/or replace. Accordingly, the first column battery modules have the lowest charging priority and/or the highest discharging priority. Meanwhile, the last column battery modules, i.e., [1, n], [2, n], . . . , [m, n], are most difficult to unload, load, and/or replace, and accordingly, the last column battery modules have the highest charging priority and/or the lowest discharging priority, and so on.

In the aforesaid cases, the relative charging current intensity and/or the relative discharging current intensity of each battery module can be determined and/or the charging and/or discharging of different battery modules can be controlled according to the above-described methods. This is to realize higher charging priority and/or lower discharging priority of the battery modules that are more difficult to unload, load, and/or replace; and/or to realize higher discharging priority and/or lower charging priority of the battery modules that are easier to unload, load, and/or replace. This way, the objectives of the present invention are realized.

Moreover, in other possible cases, the container may be provided with two or more openings for battery module loading and/or unloading. If the container is provided with a plurality of openings for battery module loading and/or unloading, the unloading, loading, and/or replacement difficulty is to be determined according to the loading position of each battery module and the position of each opening for loading and/or unloading. Lastly, in addition to the loading positions of battery modules and the position(s) of the opening(s) for loading and/or unloading, other factors that may determine the unloading, loading, and/or replacement difficulty of each battery module are not excluded by the above-described embodiments of the present invention.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A battery module charging and discharging control method for a battery system, the battery system comprising a plurality of battery modules arranged in one or more rows and one or more columns, and housed in a container, the container having one or more openings, a first battery module being positioned closer in accessing the one or more openings than a second battery module, the method comprising:
   determining, by a controller, a charging priority of each of the plurality of battery modules based on a position of the first battery module and a position of the second battery module, comprising at least one of:
      raising the charging priority of the second battery module; and
      lowering the charging priority of the first battery module;
   causing, by the controller, the battery modules with higher charging priority to be charged with higher relative charging current intensities than the battery modules with lower charging priority during charging, such that frequencies of loading, unloading, or replacing the first battery module is higher than frequencies of loading, unloading, or replacing the second battery module;
   determining, by the controller, a discharging priority of each of the plurality of battery modules based on the position of the first battery module and the position of the second battery module, comprising at least one of:
      raising the discharging priority of the first battery module; and
      lowering the discharging priority of the second battery module;
   and
   causing, by the controller, the battery modules with higher discharging priority to be discharged with higher relative discharging current intensities than the battery modules with lower discharging priority during discharging, such that the frequencies of loading, unloading, or replacing the first battery module is higher than the frequencies of loading, unloading, or replacing the second battery module.

2. The method according to claim 1, wherein the relative charging current intensity is a ratio of a charging current intensity of a battery module to an energy storage capacity of the battery module.

3. The method according to claim 1, wherein the relative discharging current intensity is a ratio of a discharging current intensity of a battery module to an energy storage capacity of the battery module.

4. A battery system comprising:
   a plurality of battery modules arranged in one or more rows and one or more columns, and housed in a container, wherein the container has one or more openings, a first battery module is positioned closer in accessing the one or more openings than a second battery module; and
   a controller for determining a charging priority of each of the plurality of battery modules based on a position of the first battery module and a position of the second battery module, the determination of the charging priority comprising at least one of:
      raising the charging priority of the second battery module; and
      lowering the charging priority of the first battery module;
   wherein the controller is further configured to cause the battery modules with higher charging priority to be charged with higher relative charging current intensities than the battery modules with lower charging priority during charging, such that frequencies of loading, unloading, or replacing the first battery module is higher than frequencies of loading, unloading, or replacing the second battery module;
   wherein the controller is further configured to determine a discharging priority of each of the plurality of battery modules based on the position of the first battery module and the position of the second battery module, the determination of the discharging priority comprising at least one of:
      raising the discharging priority of the first battery module; and
      lowering the discharging priority of the second battery module;
   and
   wherein the controller is further configured to cause the battery modules with higher discharging priority to be discharged with higher relative discharging current intensities than the battery modules with lower discharging priority during discharging, such that the frequencies of loading, unloading, or replacing the first battery module is higher than the frequencies of loading, unloading, or replacing the second battery module.

5. The system according to claim 4, wherein the relative charging current intensity is a ratio of a charging current intensity of a battery module to an energy storage capacity of the battery module.

6. The system according to claim 4, wherein the controller is further configured to:
cause the battery modules with higher discharging priority to discharge so as to charge the battery modules with higher charging priority.

7. The system according to claim 4, wherein
the relative discharging current intensity is a ratio of a discharging current intensity of a battery module to an energy storage capacity of the battery module.

8. A battery module charging and discharging control method for a battery system, the battery system comprising a plurality of battery modules arranged in one or more rows and one or more columns, and housed in a container, the container having one or more openings, a first battery module being positioned closer in accessing the one or more openings than a second battery module, the method comprising:
determining, by a controller, a charging priority of each of the plurality of battery modules based on a position of the first battery module and a position of the second battery module, comprising at least one of:
raising the charging priority of the second battery module; and
lowering the charging priority of the first battery module;
determining, by the controller, a discharging priority of each of the plurality of battery modules based on the position of the first battery module and the position of the second battery module, comprising at least one of:
raising the discharging priority of the first battery module; and
lowering the discharging priority of the second battery module;
and
causing, by the controller, the battery modules with higher discharging priority to discharge so as to charge the battery modules with higher charging priority, such that frequencies of loading, unloading, or replacing the first battery module is higher than frequencies of loading, unloading, or replacing the second battery module.

* * * * *